(12) United States Patent
Lee (10) Patent No.: US 9,158,461 B1
(45) Date of Patent: Oct. 13, 2015

(54) MEASURING PERFORMANCE OF DATA STORAGE SYSTEMS

(75) Inventor: Brian K. Lee, Yorba Linda, CA (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 282 days.

(21) Appl. No.: 13/353,064

(22) Filed: Jan. 18, 2012

(51) Int. Cl.
*G06F 12/00* (2006.01)
*G06F 3/06* (2006.01)

(52) U.S. Cl.
CPC .............. *G06F 3/061* (2013.01); *G06F 3/0611* (2013.01)

(58) Field of Classification Search
CPC ....................................................... G06F 3/061
USPC .......................................................... 711/156
See application file for complete search history.

(56) References Cited

U.S. PATENT DOCUMENTS

| | | | | |
|---|---|---|---|---|
| 4,574,346 A * | 3/1986 | Hartung | | 711/117 |
| 5,421,014 A * | 5/1995 | Bucher | | 718/100 |
| 5,581,510 A | 12/1996 | Furusho et al. | | |
| 7,873,885 B1 | 1/2011 | Shin et al. | | |
| 8,583,835 B1 * | 11/2013 | Kan | | 710/5 |
| 2002/0174297 A1 * | 11/2002 | McDonald et al. | | 711/114 |
| 2003/0196149 A1 * | 10/2003 | Gygi et al. | | 714/719 |
| 2004/0199702 A1 * | 10/2004 | Baba | | 710/305 |
| 2005/0273552 A1 | 12/2005 | Brazis et al. | | |
| 2007/0294228 A1 * | 12/2007 | Kawana | | 707/3 |
| 2009/0316546 A1 | 12/2009 | McKean et al. | | |
| 2010/0076744 A1 * | 3/2010 | Gehr et al. | | 703/24 |
| 2010/0082919 A1 * | 4/2010 | Chen et al. | | 711/161 |
| 2010/0274940 A1 * | 10/2010 | Ahmad et al. | | 710/267 |
| 2013/0031044 A1 * | 1/2013 | Miranda et al. | | 706/47 |
| 2013/0054841 A1 * | 2/2013 | Padia et al. | | 710/5 |

* cited by examiner

*Primary Examiner* — Aimee Li
*Assistant Examiner* — Kenneth Tsang
(74) *Attorney, Agent, or Firm* — Wilmer Cutler Pickering Hale and Dorr LLP (57) ABSTRACT

A combination of a host system and data storage system that enables accurate performance testing of the storage subsystem is disclosed. In one embodiment, a driver of a host system receives a command message from a host system application. The command message enables the driver to generate and communicate one or more storage access commands to the data storage system. The driver then receives one or more execution results from the data storage system and determines and communicates the total execution time of the one or more storage access commands to the host system application. When the host system application determines performance of the data storage system the undesirable impact of the communication overhead between the host system application and the driver is minimized. Accordingly, accurate performance measurements of data storage systems are obtained.

21 Claims, 5 Drawing Sheets

MEASURING PERFORMANCE OF DATA STORAGE SYSTEMS

BACKGROUND

1. Technical Field

This disclosure relates to data storage systems, such as solid state drives, for computer systems. More particularly, the disclosure relates to measuring performance of data storage systems.

2. Description of the Related Art

Sellers of data storage systems, such as disk drives that comprise solid-state memory, commonly advertise that data storage systems possess certain performance characteristics. In turn, end users may expect or need certain performance characteristics and use data storage system advertisements to make buying decisions. For example, a prospective buyer of data storage systems may view an advertisement or specification sheet which indicates that particular data storage systems can perform 50,000 input/output commands per second (IOPS). The prospective buyer may need such data storage systems and choose to purchase the advertised systems.

To ensure that data storage systems perform as advertised, data storage systems are frequently tested using drive performance testing tools before the systems are sold to end users. Importantly, the performance tests should provide accurate measurements of performance characteristics of the data storage systems. Thus, there exists a need for tools to accurately measure performance of data storage systems.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

Overview

Data storage systems or storage subsystems, such as hard disk drives, hybrid hard drives, and solid state drives, can be tested for performance characteristics. However, measuring performance characteristics can be difficult because testing systems may skew determined performance characteristics due to a testing system overhead.

For example, using an approach with no multiple threads or processors, a host system application transmits a read command (e.g., a single sector read command associated with logical block address (LBA) 0x10000) to a software/firmware driver in one embodiment. Although the term "driver" is used throughout this disclosure, in other embodiments different software, firmware, scripts, and/or hardware may be used to perform the functions described. The driver then transmits a storage access command to a data storage system controller based on the received read command. In response, the data storage system controller returns execution results to the driver, and the driver returns performance information to the host system application. When the host system application determines the speed of execution of the read command by the data storage system, the determined speed of execution may include data storage system performance time as well as host system overhead time, such as the time to transmit the read command to the driver and the time to receive performance information from the driver. The host system overhead time, thus, skews the determined speed of execution and decreases the determined performance of the data storage system. Inclusion of this overhead into performance calculation may be especially problematic in case of high performance data storage systems, such as solid state drives, which are capable of executing between 60,000 input/output operations per second (IOPS) or lower and 260,000 IOPS or higher.

In some embodiments of the present invention, a driver of a host system receives a command message from a host system application. The command message enables the driver to communicate one or more storage access commands to a storage subsystem controller. After the driver receives one or more execution results from the storage subsystem controller, the driver determines and communicates the total execution time of the one or more storage access commands to the host system application. Consequently, when the host system application determines a performance metric, such as the performance speed of the storage subsystem, the communication overhead between the host system application and driver comprises a smaller fraction of the determined performance time than if the host system application and driver communicated back-and-forth for every storage access command.

In some embodiments of the present invention, the driver processes other information (e.g., error handling) or requests (e.g., progress checks). The driver receives information from the storage subsystem, including success indications and/or error indications. The driver determines and reports error information, such as one or more error indications or a total number of error indications associated with execution of one or more storage access commands. Further, the driver provides progress status information to the host system application before receiving all expected execution results from the storage subsystem.

In some embodiments of the present invention, the command message includes information to enable the driver to prepare or generate one or more read or write storage access commands for the storage subsystem. For example, the command message can indicate that the driver should perform multiple read storage access commands, starting at a particular logical address (e.g., LBA 0x10000), ending at another logical address (e.g., LBA 0x30000), using a certain transfer size (e.g., 1 logical address at a time), and move sequentially over the logical addresses.

System Overview

Figure 1:
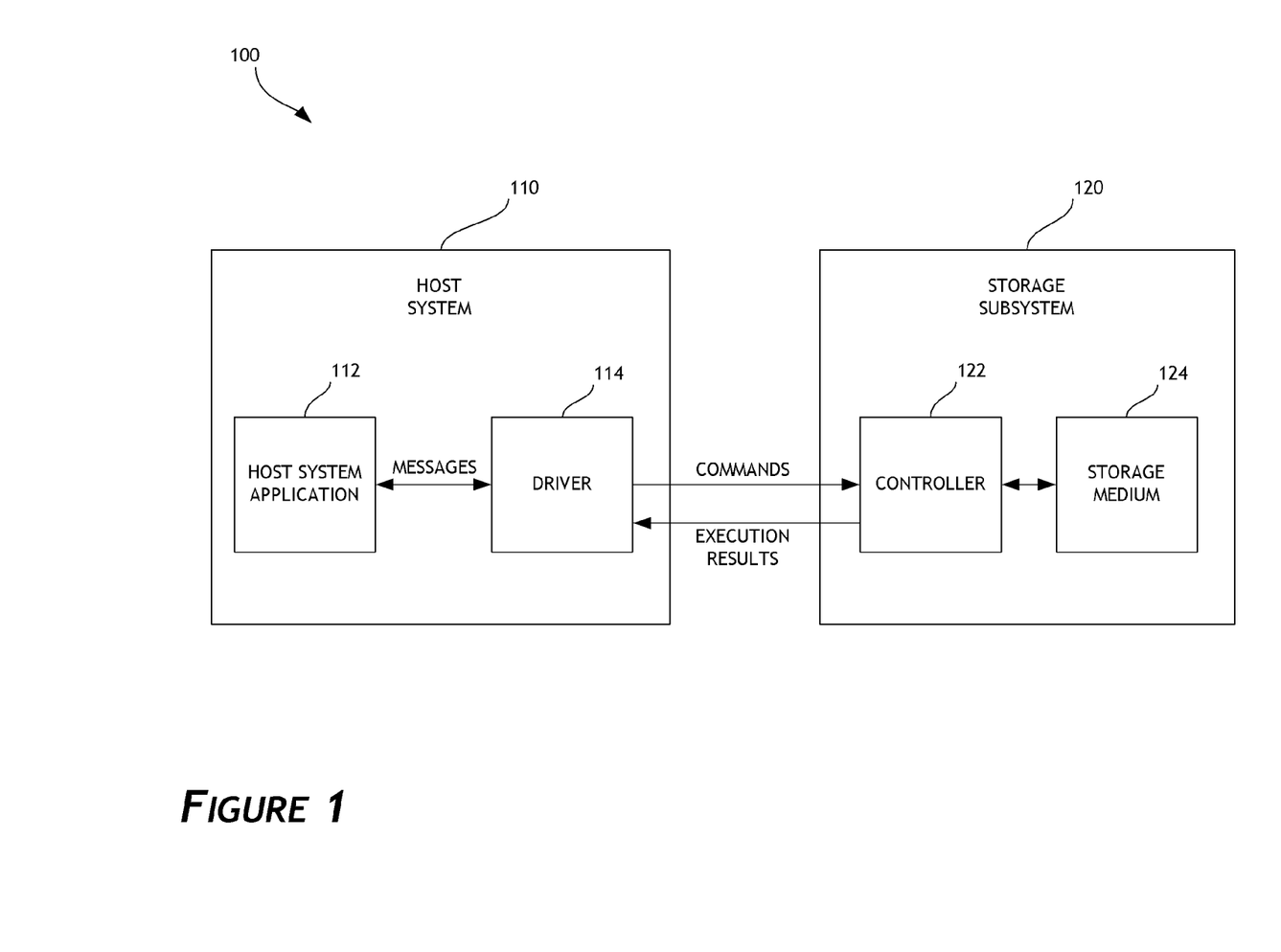
FIG. 1 illustrates a combination of a host system and a data storage system according to one embodiment of the invention.

FIG. 1 illustrates a combination 100 of a host system 110 and a data storage system or storage subsystem 120 according to one embodiment of the invention. As is shown, the host system 110 includes a host system application 112 (e.g., user level application) and a driver 114 (e.g., a device driver or kernel level driver). The storage subsystem 120 (e.g., a hard disk drive, hybrid hard drive, solid state drive, etc.) includes a controller 122 and a storage medium 124.

In one embodiment, the driver 114 is configured to receive messages from the host system application 112. The received messages include command messages, such as input/output control (IOCTL) messages. IOCTL messages include a storage access command field, a starting address field, an ending address field, a transfer size field, and a command pattern field. Those skilled in the art will appreciate that IOCTL messages can include other additional fields, not include each above field, include more than one of above fields, and the like.

The storage access command field can indicate a command type, such as a read command, write command, erase commands, etc. For example, if the storage access command field indicates a read command, the ending address field can specify the storage subsystem address (e.g., logical address, such as LBA) where a last read data command should be executed. If the storage access command field indicates a write command, the IOCTL message can further include one or more data units to be written to the storage subsystem 120. In some embodiments, the IOCTL message can include a data pattern field, for example, having a size of 64 bits. The data pattern field can indicate a data pattern to be written. For example, the following values are written: 1 is written to sector 1, 2 is written to sector 2, etc. As another example, the LBA address itself is written. Further, the data pattern field can indicate a random write where each execution of a write command can write a random number along with a value indicating the order of writing. Advantageously, such uses of the data field can enable sending data to be written more compactly than if each data value was individually transmitted.

In one embodiment, the starting address field specifies a storage subsystem address (e.g., logical address or LBA) where a first storage access command corresponding to the storage access command field should be executed. Additionally, the transfer size field can specify the transfer size of data (e.g., number of sectors) for a current storage access command. The command pattern field specifies an execution pattern of the one or more storage access commands. The command pattern field can indicate a random (e.g., random logical address within a range), sequential (e.g., LBA 0, LBA 1, LBA 2, LBA 3, etc.), or butterfly pattern (i.e., alternating between beginning and ending addresses, e.g., LBA 0, LBA 100, LBA 1, LBA 99, LBA 2, LBA 98, etc.), among other possibilities.

The driver 114 can be configured to transmit data and/or storage access commands to the controller 122 of the storage subsystem 120. Storage access commands can include write data commands and read data commands issued by the host system application 112 via command messages. Storage access commands can be communicated by the driver 114 in sets or individually to the controller 122. The controller 122 can then execute the received storage access commands in the storage medium 124.

The driver 114 can be configured to receive execution results from the controller 122 in response to the execution of the storage access commands. Execution results can be received in sets or individually from the controller 122. The driver can elect to wait for receipt (e.g., via polling or interrupt) of one or more execution results before communicating one or more additional storage access commands. In one embodiment, the driver 114 receives an interrupt from the controller 122 when one or more execution results are available. In another embodiment, the driver 114 communicates one or more additional storage access commands without waiting to receive execution results. In yet another embodiment, the driver 114 communicates all storage access commands to the controller 122 without waiting for any execution results, and considers the execution results after all the storage access commands have been communicated.

Execution results can indicate success or error in the execution of one or more storage access commands. In the case of an error indication, the driver 114 can receive an error report from the controller 122. The error report can, for example, include one or more error indications or a total number of error indications associated with execution of one or more storage access commands.

The driver 114 can be configured to determine a total execution time of one or more storage access commands by the storage subsystem 120. The determination can be based in part on one or more execution results received from the controller 122. For example, the driver 114 can calculate the time to execute a set of storage access commands by determining the duration of time between sending the set of commands to the controller 122 and receiving a final execution result corresponding to the last executed storage access command.

In one embodiment, the driver 114 is configured to determine a measure of progress by the controller 122 in executing one or more storage access commands. The driver 114, for example, determines the total number of commands sent, as well as the number of execution results received. By considering the total number of commands sent and the number of execution results received, the driver determines a progress and/or percentage of execution of the one or more storage access commands. Also, the driver 114 can determine an execution time of a subset of storage access commands already communicated to the storage subsystem and/or a number of storage access commands that have not yet been communicated to the storage subsystem.

The driver 114 can be configured to transmit messages to the host system application 112. The messages can include performance timing messages. The performance timing messages can indicate the total execution time of one or more storage access commands, the number of commands performed per second, and/or the progress by the controller 122, among other possible information. Receipt of one or more performance timing messages by the host system application 112 can enable the host system application 112 to utilize information in the performance timing message to determine a performance metric, such as the performance of the storage subsystem 120. For example, the host system application can determine a number of IOPS completed by a storage subsystem, based on dividing the time between sending a first IOCTL message and receiving the last performance timing message from the driver 114 into the number of storage access commands associated with the IOCTL messages.

Further, the driver 114 can be configured to receive and respond to check status messages or commands from the host system application 112. In one embodiment, at any time, the host system application 112 can request performance timing messages from the driver 114 via check status messages. The driver 114 provides progress information based on the information is available to the driver 114. For example, by considering the total number of commands sent and the number of execution results received, the driver provides partial progress and/or percentage of execution.

Figure 2A:
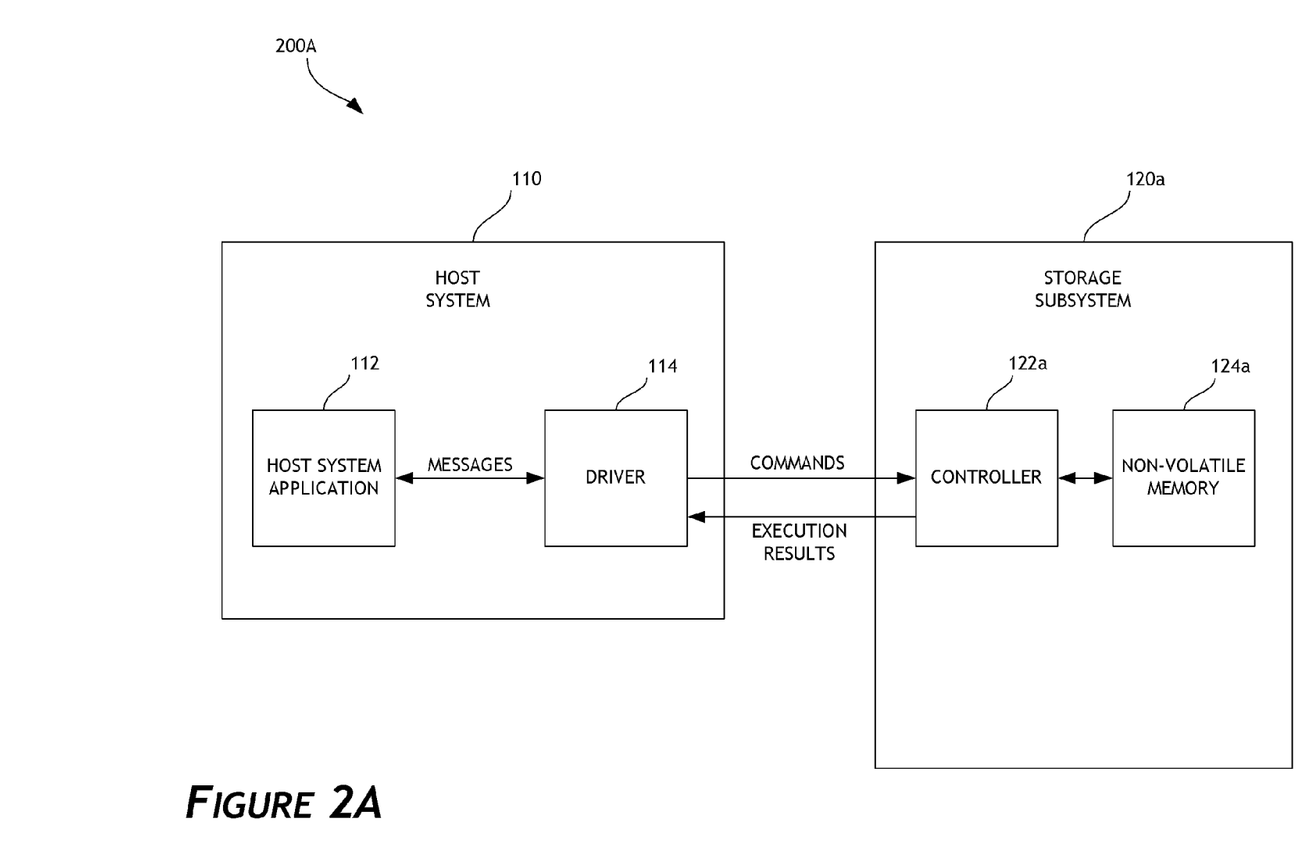
FIG. 2A illustrates another combination of a host system and a data storage system according to one embodiment of the invention.

FIG. 2A illustrates a combination 200A of a host system 110 and a storage subsystem 120a according to one embodiment of the invention. As shown, the storage subsystem 120a (e.g., a solid state drive) includes a non-volatile memory 124a array, such as array of flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), other discrete NVM (non-volatile memory) chips, or any combination thereof. The storage subsystem 120a further includes a controller 122a configured to execute storage access commands in the non-volatile memory 124a.

Figure 2B:
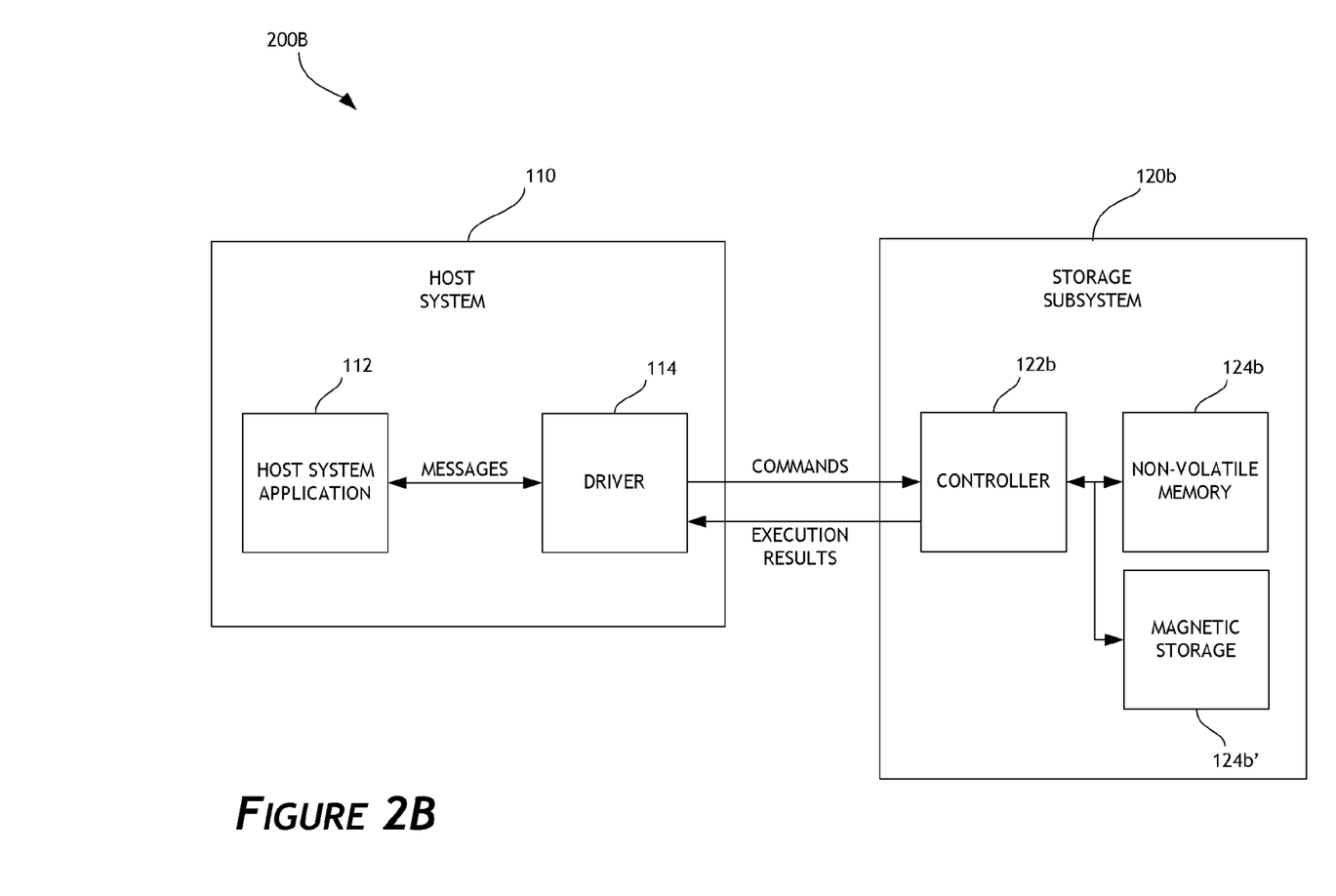
FIG. 2B illustrates yet another combination of a host system and a data storage system according to one embodiment of the invention.

FIG. 2B illustrates a combination 200B of a host system 110 and a storage subsystem 120b according to one embodiment of the invention. As shown, the storage subsystem 120b (e.g., a hybrid hard drive) includes a non-volatile memory array 124b and magnetic storage 124b'. The non-volatile memory 124b comprises solid-state or non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), Magnetoresistive RAM (MRAM), other discrete NVM (non-volatile memory) chips, or any combination thereof. The magnetic storage 124b' comprises magnetic media (e.g., one or more magnetic disks).

The storage subsystem 120a further includes a controller 122b configured to execute storage access commands in the non-volatile memory 124b and magnetic storage 124b'. The controller 122b determines whether a particular command should be executed in the non-volatile memory 124b and/or the magnetic storage 124b'.

Measuring Performance

Figure 3:
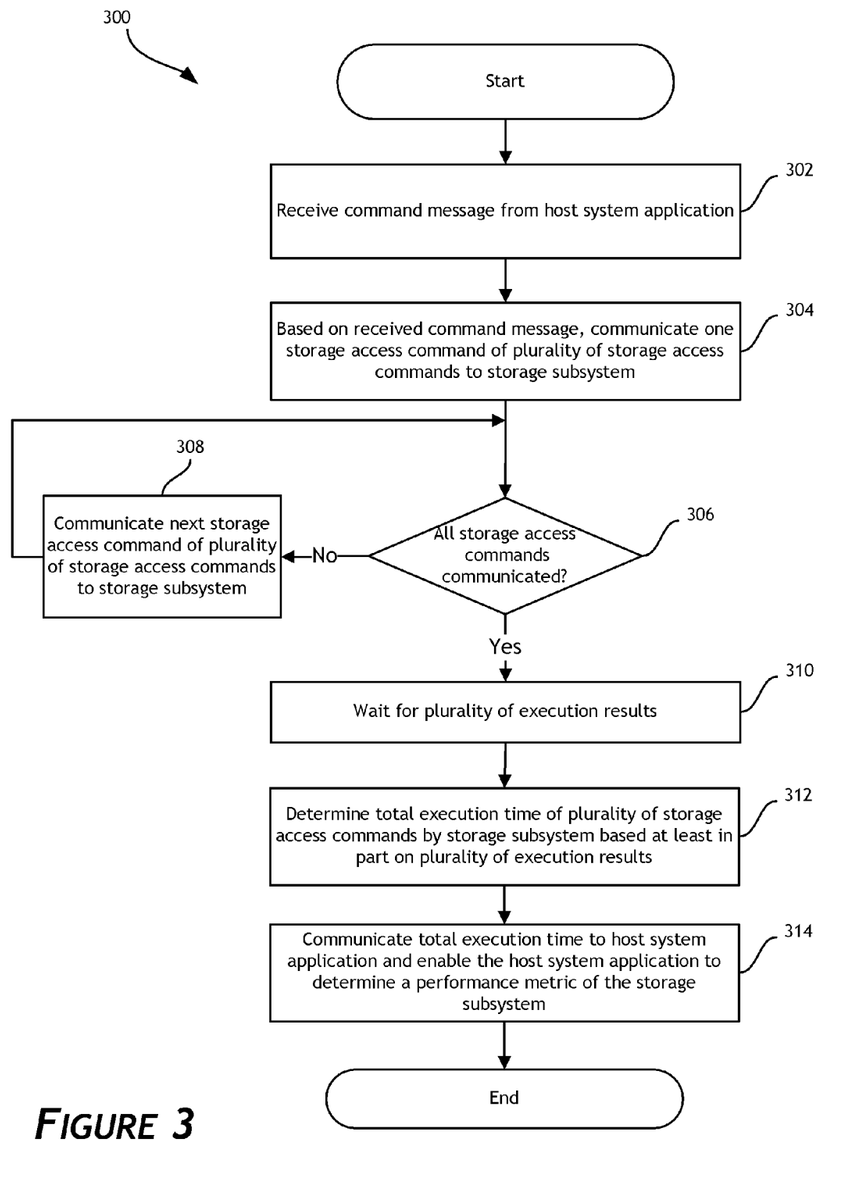
FIG. 3 illustrates a flow diagram of drive performance testing according to one embodiment of the invention.

FIG. 3 illustrates a flow diagram 300 of drive performance testing according to one embodiment of the invention. In one embodiment, the process 300 can be executed collectively by the driver 114 of the host system 110, the host system application 112, and the controller of the storage subsystem. In another embodiment, the process 300 can be executed by the host system 110 (e.g., under control of the driver 114 and/or the host system application 112).

In block 302, the process 300 receives a command message, such as an IOCTL message, from a host system application 112. In block 304, the process 300 determines or generates a plurality of storage access commands to communicate based on the received command message. The process 300 communicates one storage access command of a plurality of storage access commands to a storage subsystem 120/120a/120b. For example, the process 300 communicates a storage access command associated with a starting address of the storage subsystem.

In block 306, the process 300 determines whether all storage access commands of the plurality have been communicated to the storage subsystem 120/120a/120b. If all storage access commands have not been communicated, the process 300 moves to block 308. In block 308, the process 300 communicates a next storage access command of the plurality of storage access commands to the storage subsystem 120/120a/120b. The process 300 then moves again to block 306, and the process 300 determines whether all storage access commands indicated by the command message have been communicated to the storage subsystem 120/120a/120b. The process 300 continues executing this loop until all commands of the plurality have been communicated to the storage subsystem.

When all storage access commands have been communicated to the storage subsystem 120/120a/120b, the process 300 moves to block 310. In block 310, the process 300 waits to receive a plurality of execution results from the controller 122/122a/122b. For example, the process 300 can receive an interrupt from the controller 122/122a/122b when one or more execution results are available. In one embodiment, the process 300 can request the execution results from the controller 122/122a/122b (e.g., the last x number of results). In another embodiment, the execution results are stored in a memory location accessible by the controller.

In block 312, the process 300 determines a total execution time of the plurality of storage access commands by the storage subsystem 120/120a/120b based at least in part on the plurality of execution results. For example, the process 300 can calculate the time to execute a set of storage access commands by determining the duration of time between sending the set of storage access commands to the controller 122 and receiving the final execution result (e.g., time duration between block 304 and block 310).

In block 314, the process 300 communicates the total execution time to the host system application 112. In one embodiment, the communication of the total execution time enables the host system application 112 to determine a performance metric, such as the performance of the storage subsystem 120 as measured by IOPS of the plurality of storage access commands. For example, the time between the host system application 112 communicating the command message to the driver 114 and receiving the total execution time can be determined. Performance (e.g., IOPS) is then determined by dividing this determined time into the number of storage access commands in the plurality of storage access commands.

Figure 4:
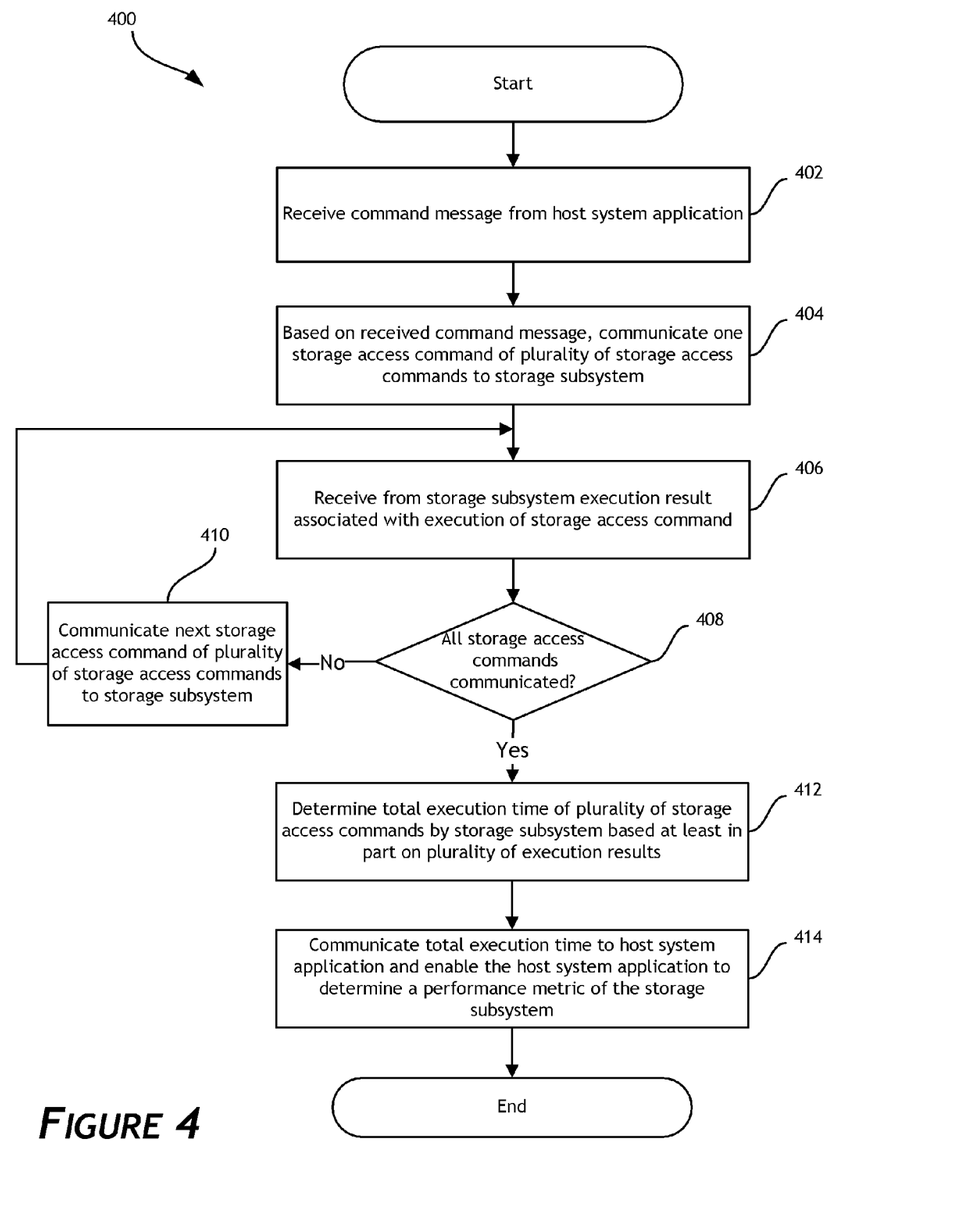
FIG. 4 illustrates another flow diagram of drive performance testing according to one embodiment of the invention.

FIG. 4 illustrates a flow diagram 400 of drive performance testing according to one embodiment of the invention. In one embodiment, the process 400 can be executed collectively by the driver 114 of the host system 110, the host system application 112, and the controller of the storage subsystem. In another embodiment, the process 400 can be executed by the host system 110 (e.g., under control of the driver 114 and/or the host system application 112).

In block 402, the process 400 receives a command message, such as an IOCTL message, from a host system application 112. In block 404, the process 400 determines or generates a plurality of storage access commands to communicate based on the received command message. The process 400 communicates one storage access command of a plurality of storage access commands to a storage subsystem 120/120a/120b.

In block 406, the process 400 receives from the storage subsystem 120/120a/120b an execution result associated with the execution of the storage access command.

In block 408, the process 400 determines whether all storage access commands of the plurality have been communicated to the storage subsystem 120/120a/120b. If all storage access commands have not been communicated, the process 400 moves to block 410. In block 410, the process 400 communicates a next storage access command of the plurality of storage access commands to the storage subsystem 120/120a/120b. The process 400 then moves again to block 406, and the process 400 receives from the storage subsystem 120/120a/120b an execution result associated with the execution of the next storage access command. The process 400 then moves again to block 408 and determines whether all storage access commands indicated by the command message have been communicated to the storage subsystem 120/120a/120b. The process 300 continues executing this loop until all commands of the plurality have been communicated to the storage subsystem and all execution results have been received.

When all storage access commands have been communicated to the storage subsystem 120/120a/120b, the process 400 moves to block 412. In block 412, the process 400 determines a total execution time of the plurality of storage access commands by the storage subsystem 120/120a/120b based at least in part on the plurality of execution results. For example, the process 400 can calculate the time to execute a set of storage access commands by determining the duration of time between sending the set of commands to the controller 122 and receiving the final execution result (e.g., time duration between first execution of block 404 and first execution of block 406).

In block 414, the process 400 communicates the total execution time to the host system application 112. In one embodiment, the communication of the total execution time enables the host system application 112 to determine a performance metric, such as the performance speed for the storage subsystem 120 as measured by IOPS of the plurality of storage access commands.

CONCLUSION

When testing performance of data storage systems, the overhead time associated with a host system should be minimized to obtain accurate performance assessments. To decrease the impact of the overhead associated with the host system, a driver of the host system can receive from a host system application a command message, which enables the driver to generate and communicate one or more storage access commands to a data storage system controller. After the driver receives one or more execution results from the data storage system controller, the driver can determine and communicate the total execution time of the one or more storage access commands to the host system application. Consequently, when the host system application determines a performance metric, such as performance speed of a data storage system as measured in IOPS, the undesirable impact of the communication overhead between the host system application and the driver can be minimized. Accordingly, accurate performance measurements of data storage systems can be obtained.

Other Variations

Those skilled in the art will appreciate that in some embodiments, other types of communications can be implemented between system components. Further, additional system components can be utilized, and disclosed system components can be combined or omitted. For example, the functionality of the host system application 112 can be implemented by the driver 114 and vice versa. In addition, the actual steps taken in the disclosed processes, such as the process illustrated in FIGS. 3 and 4, may differ from those shown in the figures. Depending on the embodiment, certain of the steps described above may be removed, others may be added. For instance, when the functionality of the host system application 112 is implemented by the driver or vice versa, steps 302, 402, 314, and 414 may be omitted and steps 304 and 404 may be modified. Accordingly, the scope of the present disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of testing performance of a storage subsystem, the method comprising:

receiving, by a driver running on a host system comprising computer hardware, a first command message from a host system application running on the host system, the first command message comprising instructions to generate a plurality of storage access commands including a first storage access command and a second storage access command, wherein the first storage access command and the second storage access command are not received separately at the driver from the host system application;

generating, by the driver, the plurality of storage access commands according to the instructions of the first command message;

communicating, by the driver, the plurality of storage access commands to a storage subsystem thereby causing the storage subsystem to execute the plurality of storage access commands;

receiving, by the driver, from the storage subsystem a plurality of execution results associated with execution of the plurality of storage access commands by the storage subsystem;

determining, by the driver, a total execution time of the plurality of storage access commands by the storage subsystem based at least in part on when the plurality of storage access commands are communicated by the driver to the storage subsystem and when the plurality of execution results are available from the storage subsystem;

communicating, by the driver, the total execution time to the host system application causing the host system application to determine a number of input/output commands per unit of time for the storage subsystem for executing at least the plurality of storage access commands, wherein the number of input/output commands per unit of time incorporates a communication time associated with receiving at the driver the first command message from the host system application and does not incorporate a communication time associated with separately receiving at the driver the first storage access command and the second storage access command from the host system application; and prior to receiving, by the driver, from the storage subsystem all of the plurality of execution results, communicating, by the driver, to the host system application a partial execution time reflecting a time for the storage subsystem to execute a subset of the plurality of storage access commands communicated by the driver to the storage subsystem, causing the host system application to determine an estimate of the number of input/output commands per unit of time for the storage subsystem.

2. The method of claim 1, wherein the first command message comprises at least a storage access command field and a starting address field, the starting address field specifying a first storage subsystem address where an access command indicated by the storage access command field is to be executed.

3. The method of claim 2, wherein when the storage access command field indicates a read data command, the first command message further comprises an ending address field, the ending address field specifying a second storage subsystem address where a last read data command is to be executed.

4. The method of claim 1, further comprising:
communicating, by the host system application, the first command message to the driver;
receiving, by the host system application, the total execution time from the driver; and
determining, by the host system application, the number of input/output commands per unit of time based at least in part on when the first command message is communicated by the host system application to the driver or when the total execution time is received by the host system application from the driver.

5. The method of claim 2, wherein when the storage access command field indicates a write data command, the first command message further comprises a data pattern to be written in the storage subsystem.

6. The method of claim 2, wherein the first command message further comprises:
a transfer size field specifying a transfer size of data for the access command indicated by the storage access command field; and
a command pattern field specifying an execution pattern of the plurality of storage access commands, wherein the command pattern field comprises at least one of: random, sequential, and butterfly.

7. The method of claim 1, wherein:
said communicating the plurality of storage access commands to the storage subsystem comprises separately communicating each storage access command of the plurality of storage access commands; and
said receiving from the storage subsystem the plurality of execution results comprises receiving an individual execution result for each storage access command of the plurality of storage access commands.

8. The method of claim 7, wherein said receiving from the storage subsystem the plurality of execution results comprises receiving an execution result for the first storage access command prior to communicating, by the driver, the second storage access command to the storage subsystem.

9. The method of claim 7, wherein the individual execution result comprises one of: a success indication or an error indication.

10. The method of claim 9, further comprising communicating, by the driver, an error report comprising at least one of: a total number of error indications associated with execution of the plurality of storage access commands and one or more error indications associated with execution of the plurality of storage access commands.

11. The method of claim 1, further comprising in response to receiving a second command message from the host system application, communicating, by the driver, to the host system application a number of storage access commands of the plurality of storage access commands that have not been communicated by the driver to the storage subsystem.

12. A non-transitory computer storage that stores executable program instructions that direct a host system to perform a process that comprises:
generating, by a driver running on the host system, a plurality of storage access commands according to instructions of a first command message from a host system application running on the host system, the instructions indicating to generate the plurality of storage access commands including a first storage access command and a second storage access command;
communicating, by the driver, the plurality of storage access commands to a storage subsystem thereby causing the storage subsystem to execute the plurality of storage access commands;
receiving, by the driver, from the storage subsystem a plurality of execution results associated with execution of the plurality of storage access commands by the storage subsystem;
determining, by the driver, a total execution time of the plurality of storage access commands by the storage subsystem based at least in part on when the plurality of storage access commands are communicated by the driver to the storage subsystem and when the plurality of execution results are available from the storage subsystem;
communicating, by the driver, the total execution time to the host system application causing the host system application to determine a performance metric of the storage subsystem for executing the plurality of storage access commands, wherein the performance metric incorporates a communication time associated with receiving at the driver the first command message from the host system application and does not incorporate a communication time associated with separately receiving at the driver the first storage access command and the second storage access command from the host system application; and
prior to receiving, by the driver, from the storage subsystem all of the plurality of execution results, communicating, by the driver, to the host system application a partial execution time reflecting a time for the storage subsystem to execute a subset of the plurality of storage access commands communicated by the driver to the storage subsystem, causing the host system application to determine an estimate of the performance metric of the storage subsystem.

13. The non-transitory computer storage of claim 12, wherein:
said communicating the plurality of storage access commands to the storage subsystem comprises separately communicating each storage access command of the plurality of storage access commands; and
said receiving from the storage subsystem the plurality of execution results comprises receiving an individual execution result for each storage access command of the plurality of storage access commands.

14. The non-transitory computer storage of claim 13, wherein said receiving from the storage subsystem the plurality of execution results comprises receiving an execution result for the first storage access command prior to communicating the second storage access command.

15. The non-transitory computer storage of claim 12, wherein the process further comprises:

in response to receiving a second command message from the host system application, communicating, by the driver, to the host system application a number of storage access commands of the plurality of storage access commands that have not been communicated by the driver to the storage subsystem.

16. A host system that communicates data storage access commands to a storage subsystem, the host system comprising:

a memory storing a driver; and
a hardware processor configured to load the driver from the memory and execute the driver,
wherein when the driver is executed by the hardware processor, the driver is configured to:
receive a first command message from a host system application also being executed by the hardware processor, the first command message comprising instructions to generate a plurality of storage access commands including a first storage access command and a second storage access command;
generate the plurality of storage access commands according to the instructions of the first command message;
communicate the plurality of storage access commands to the storage subsystem thereby causing the storage subsystem to execute the plurality of storage access commands;
receive from the storage subsystem a plurality of execution results associated with execution of the plurality of storage access commands by the storage subsystem;
determine a total execution time of the plurality of storage access commands by the storage subsystem based at least in part on when the plurality of storage access commands are communicated by the driver to the storage subsystem and when the plurality of execution results are available from the storage subsystem;
communicate the total execution time to the host system application causing the host system application to determine a performance metric of the storage subsystem for executing the plurality of storage access commands, wherein the performance metric incorporates a communication time associated with receiving at the driver the first command message from the host system application and does not incorporate a communication time associated with separately receiving at the driver the first storage access command and the second storage access command from the host system application; and
prior to receiving from the storage subsystem all of the plurality of execution results, communicate to the host system application a partial execution time reflecting a time for the storage subsystem to execute a subset of the plurality of storage access commands communicated by the driver to the storage subsystem, causing the host system application to determine an estimate of the performance metric of the storage subsystem.

17. The host system of claim 16, wherein memory further stores the host system application, and when the host system application is executed by the hardware processor, the host system application is configured to:

communicate the first command message to the driver;
receive the total execution time from the driver; and
determine the performance metric based at least in part on when the first command message is communicated by the host system application to the driver and or when the total execution time is received by the host system application from the driver.

18. The host system of claim 16, wherein when the driver is executed by the hardware processor, the driver is further configured to:

separately communicate each storage access command of the plurality of storage access commands; and
receive an individual execution result for each storage access command of the plurality of storage access commands.

19. The host system of claim 18, wherein when the driver is executed by the hardware processor, the driver is further configured to receive an execution result for the first storage access command prior to communicating the second storage access command.

20. The host system of claim 16, wherein when the driver is executed by the hardware processor, the driver is further configured to:

in response to receiving a second command message from the host system application, communicate, to the host system application a number of storage access commands of the plurality of storage access commands that have not been communicated by the driver to the storage subsystem.

21. The method of claim 1, wherein the total execution time comprises a duration between when the plurality of storage access commands are communicated by the driver to the storage subsystem and when the plurality of execution results are available from the storage subsystem.

* * * * *